(12) United States Patent
A et al.

(10) Patent No.: US 12,713,134 B2
(45) Date of Patent: Aug. 18, 2026

(54) SYSTEM AND METHOD FOR GYROSCOPE-SYNCHRONIZED PTZ CAMERA SYSTEM

(71) Applicant: HONEYWELL INTERNATIONAL INC., Charlotte, NC (US)

(72) Inventors: Ramkumar A, Madurai (IN); Gobinathan Baladhandapani, Madurai (IN); Ranganathan Elumalai, Madurai (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 18/968,594

(22) Filed: Dec. 4, 2024

(65) Prior Publication Data

US 2026/0113541 A1 Apr. 23, 2026

(30) Foreign Application Priority Data

Oct. 18, 2024 (IN) ............................ 202411079275

(51) Int. Cl.
*H04N 23/695* (2023.01)
*H04N 23/68* (2023.01)

(52) U.S. Cl.
CPC ....... *H04N 23/695* (2023.01); *H04N 23/6812* (2023.01)

(58) Field of Classification Search
None
See application file for complete search history.

(56) References Cited

U.S. PATENT DOCUMENTS

2019/0228667 A1* 7/2019 Matsumoto ............ H04R 1/028
2024/0371039 A1* 11/2024 Ye ............................ G06T 7/80
2024/0395154 A1* 11/2024 Pearson .................. G08G 5/80

OTHER PUBLICATIONS

Hlotov, "Determining of correlation relationship between roll, pitch, and yaw of UAVs" (Year: 2019).*

* cited by examiner

*Primary Examiner* — Eileen M Adams
(74) *Attorney, Agent, or Firm* — Ingrassia Fisher & Lorenz

(57) ABSTRACT

A computer-implemented method includes: receiving rotorcraft orientation angles including a roll angle, a pitch angle, and a yaw angle from one or more gyroscope(s) on a rotorcraft; receiving PTZ camera orientation angles including a PTZ camera roll angle, a PTZ camera pitch angle, and a PTZ camera yaw angle from a PTZ camera on the rotorcraft; calculating an error between the rotorcraft orientation angles and the PTZ camera orientation angles; generating PTZ camera orientation angle adjustment data based on the error between the rotorcraft orientation angles and the PTZ camera orientation angles; and providing the PTZ camera orientation angle adjustment data to the PTZ camera for use by the PTZ camera to adjust PTZ camera orientation angles; wherein the PTZ camera adjusts the PTZ camera orientation angles based on the PTZ camera orientation angle adjustment data.

20 Claims, 7 Drawing Sheets

200
202

200
208
Gyroscope Sensor
206
206a
204
206b
Motor
Image Capture Sensor
Motor
212
Controller
214
210
216
Input
Output
Memory 502
504
506
508
510
512
514
516
518
520
522
524
526
527
528
529

523
552
554
556
558
Kd
Kp
Ki
s
1/s 532
544
PTZ camera
534
540
Feedback Network
538
Gyroscope(s)
536
542

562
574
Position measurements
578
Translation adjustment module
576
580
PTZ camera
564
570
Feedback Network
568
Gyroscope(s)
566
572

SYSTEM AND METHOD FOR GYROSCOPE-SYNCHRONIZED PTZ CAMERA SYSTEM

CROSS REFERENCE TO RELATED APPLICATION

This application claims priority to India Provisional Patent Application No. 202411079275, filed Oct. 18, 2024, the entire content of which is incorporated by reference herein.

TECHNICAL FIELD

The technical field generally relates to navigational aids, and more particularly relates to systems and methods for search and rescue camera control for rotorcrafts.

BACKGROUND

In a scenario where someone falls into the sea, a rotorcraft hovers above the person to conduct a rescue operation. Both the rotorcraft and the fallen person are subjected to frequent movements due to wind and wave dynamics making it challenging to maintain a stable visual lock for video capture. Traditional image comparison methods may fail to provide reliable reference points for guiding the rescue operation effectively.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In some aspects, the techniques described herein relate to a camera system on a rotorcraft, the camera system including: a pan-tilt-zoom (PTZ) camera; and an electronics control unit configured to provide adjustment data to the PTZ camera for adjusting roll, pitch, and yaw orientation angles of the PTZ camera, the electronics control unit including a controller configured to: receive rotorcraft orientation angles including a roll angle, a pitch angle, and a yaw angle from one or more gyroscope(s) on the rotorcraft; receive PTZ camera orientation angles including a PTZ camera roll angle, a PTZ camera pitch angle, and a PTZ camera yaw angle from the PTZ camera; calculate an error between the rotorcraft orientation angles and the PTZ camera orientation angles; generate PTZ camera orientation angle adjustment data based on the error between the rotorcraft orientation angles and the PTZ camera orientation angles; and provide the PTZ camera orientation angle adjustment data to the PTZ camera for use by the PTZ camera to adjust PTZ camera orientation angles; wherein the PTZ camera is configured to adjust the PTZ camera orientation angles based on the PTZ camera orientation angle adjustment data.

In some aspects, the techniques described herein relate to a camera system, wherein the controller is further configured to: receive a change in XYZ coordinate position of the rotorcraft; calculate PTZ coordinate adjustment data for the PTZ camera based on the change in XYZ coordinate position of the rotorcraft; and provide the PTZ coordinate adjustment data to the PTZ camera; wherein the PTZ camera is configured to adjust the PTZ camera orientation angles based on the PTZ coordinate adjustment data.

In some aspects, the techniques described herein relate to a computer-implemented method including: receiving rotorcraft orientation angles including a roll angle, a pitch angle, and a yaw angle from one or more gyroscope(s) on a rotorcraft; receiving PTZ camera orientation angles including a PTZ camera roll angle, a PTZ camera pitch angle, and a PTZ camera yaw angle from a PTZ camera on the rotorcraft; calculating an error between the rotorcraft orientation angles and the PTZ camera orientation angles; generating PTZ camera orientation angle adjustment data based on the error between the rotorcraft orientation angles and the PTZ camera orientation angles; and providing the PTZ camera orientation angle adjustment data to the PTZ camera for use by the PTZ camera to adjust PTZ camera orientation angles; wherein the PTZ camera adjusts the PTZ camera orientation angles based on the PTZ camera orientation angle adjustment data.

In some aspects, the techniques described herein relate to a computer-implemented method, further including: receiving a change in XYZ coordinate position of the rotorcraft; calculating PTZ coordinate adjustment data for the PTZ camera based on the change in XYZ coordinate position of the rotorcraft; and providing the PTZ coordinate adjustment data to the PTZ camera; wherein the PTZ camera adjusts the PTZ camera orientation angles based on the PTZ coordinate adjustment data.

In some aspects, the techniques described herein relate to a non-transitory computer-readable medium having stored thereon instructions which when executed by a processor cause the processor to perform a method including: receiving rotorcraft orientation angles including a roll angle, a pitch angle, and a yaw angle from one or more gyroscope(s) on a rotorcraft; receiving PTZ camera orientation angles including a PTZ camera roll angle, a PTZ camera pitch angle, and a PTZ camera yaw angle from a PTZ camera on the rotorcraft; calculating an error between the rotorcraft orientation angles and the PTZ camera orientation angles; generating PTZ camera orientation angle adjustment data based on the error between the rotorcraft orientation angles and the PTZ camera orientation angles; and providing the PTZ camera orientation angle adjustment data to the PTZ camera for use by the PTZ camera to adjust PTZ camera orientation angles; wherein the PTZ camera adjusts the PTZ camera orientation angles based on the PTZ camera orientation angle adjustment data.

In some aspects, the techniques described herein relate to a non-transitory computer-readable medium, wherein the method further includes: receiving a change in XYZ coordinate position of the rotorcraft; calculating PTZ coordinate adjustment data for the PTZ camera based on the change in XYZ coordinate position of the rotorcraft; and providing the PTZ coordinate adjustment data to the PTZ camera; wherein the PTZ camera adjusts the PTZ camera orientation angles based on the PTZ coordinate adjustment data.

In some aspects, the techniques described herein relate to a camera system on a rotorcraft, the camera system including: a pan-tilt-zoom (PTZ) camera; and an electronics control unit configured to provide adjustment data to the rotorcraft for aligning the rotorcraft to an intended path, the electronics control unit including a controller configured to: receive rotorcraft orientation angles including a roll angle, a pitch angle, and a yaw angle from one or more gyroscope(s) on the rotorcraft while the rotorcraft is moving toward a target; receive PTZ camera orientation angles including a PTZ camera roll angle, a PTZ camera pitch angle, and a PTZ camera yaw angle from the PTZ camera while the PTZ camera is locked onto the target; calculate an error between the rotorcraft orientation angles and the PTZ camera orientation angles; generate rotorcraft orientation angle correction data for correcting rotorcraft orientation angles for landing at a target; generate rotorcraft lateral distance correction data for correcting a lateral distance required for vertical landing at the target; and provide the rotorcraft orientation angle correction data and the rotorcraft lateral distance correction data to the rotorcraft for use by the rotorcraft to align the rotorcraft to a path to the target.

In some aspects, the techniques described herein relate to a computer-implemented method including: receiving rotorcraft orientation angles including a roll angle, a pitch angle, and a yaw angle from one or more gyroscope(s) on a rotorcraft while the rotorcraft is moving toward a target; receiving PTZ camera orientation angles including a PTZ camera roll angle, a PTZ camera pitch angle, and a PTZ camera yaw angle from the PTZ camera while the PTZ camera is locked onto the target; calculating an error between the rotorcraft orientation angles and the PTZ camera orientation angles; generating rotorcraft orientation angle correction data for correcting rotorcraft orientation angles for landing at a target; generating rotorcraft lateral distance correction data for correcting a lateral distance required for vertical landing at the target; and providing the rotorcraft orientation angle correction data and the rotorcraft lateral distance correction data to the rotorcraft for use by the rotorcraft to align the rotorcraft to a path to the target.

In some aspects, the techniques described herein relate to a non-transitory computer-readable medium having stored thereon instructions which when executed by a processor cause the processor to perform a method including: receiving rotorcraft orientation angles including a roll angle, a pitch angle, and a yaw angle from one or more gyroscope(s) on a rotorcraft while the rotorcraft is moving toward a target; receiving PTZ camera orientation angles including a PTZ camera roll angle, a PTZ camera pitch angle, and a PTZ camera yaw angle from the PTZ camera while the PTZ camera is locked onto the target; calculating an error between the rotorcraft orientation angles and the PTZ camera orientation angles; generating rotorcraft orientation angle correction data for correcting rotorcraft orientation angles for landing at a target; generating rotorcraft lateral distance correction data for correcting a lateral distance required for vertical landing at the target; and providing the rotorcraft orientation angle correction data and the rotorcraft lateral distance correction data to the rotorcraft for use by the rotorcraft to align the rotorcraft to a path to the target.

Furthermore, other desirable features and characteristics will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word “exemplary” means “serving as an example, instance, or illustration. ” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for providing a Gyroscope-Synchronized PTZ Camera System for Rotorcraft is disclosed. The system and method integrate gyroscope synchronization between the rotorcraft’s gyroscope and the PTZ (Pan-Tilt-Zoom) camera’s gyroscope. This synchronization ensures that the PTZ camera maintains a stable visual lock on a point of interest, despite rotorcraft movements. By aligning the PTZ camera’s orientation with the rotorcraft’s orientation, the system enables stable and synchronized video capture throughout rescue operations.

Figure 1A:
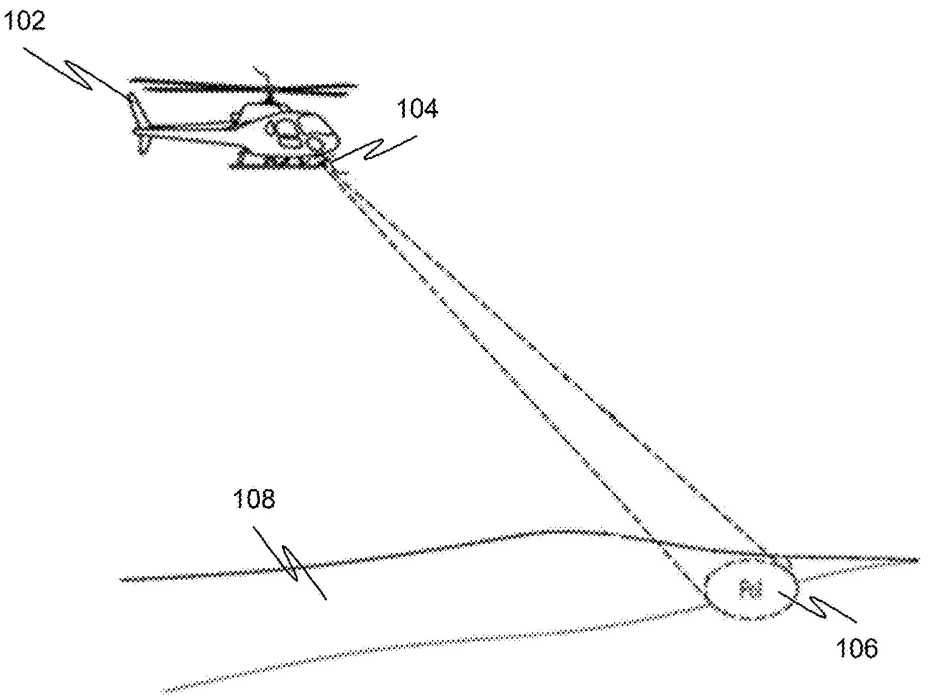
FIGS. 1A and 1B are diagrams depicting an example rotorcraft at different stages in a search and rescue operation, in accordance with various embodiments.
Figure 1B:
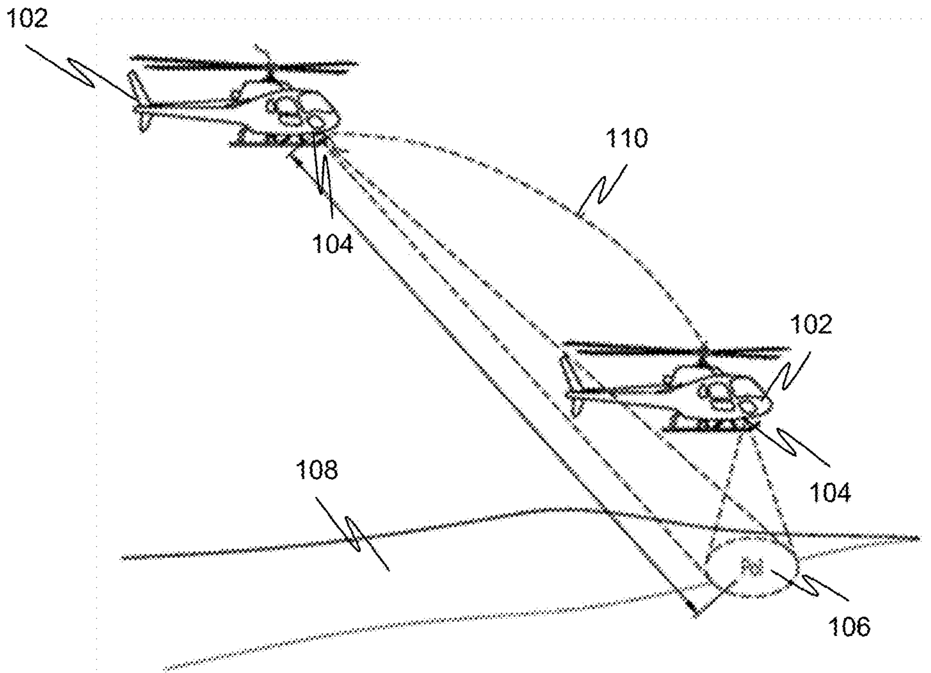

FIGS. 1A and 1B are diagrams depicting an example rotorcraft 102 at different stages in a search and rescue operation. The example rotorcraft 102 (e.g., a helicopter) includes a Pan-Tilt-Zoom camera (PTZ camera 104) for capturing video of a point of interest (POI 106) throughout a rescue operation. In the example of FIG. 1A, a PTZ camera 104 on the rotorcraft 102 is directed to the POI 106 and captures video of the POI 106 during a rescue operation. In this example, the POI 106 (e.g., an object or a person) is in a body of water 108 and is subject to movement (e.g., up, down, side-to-side, etc.). The rotorcraft 102 is also subject to movement 110 as illustrated in the example of FIG. 1B. To ensure success of the rescue operation, video lock by the PTZ camera 104 on the POI 106 is desired.

To facilitate flight operations, the pilot of the rotorcraft 102 may utilize flight instruments, such as pitot-static instruments (e.g., Altimeter, Airspeed indicator, Vertical speed indicator, and/or others), gyroscopic instruments (e.g., Attitude indicator, Heading indicator, Turn coordinator, and/or others), and Navigational instruments (e.g., Course deviation indicator, GPS, and/or others). The example rotorcraft 102 includes a synchronization system (not shown) for maintaining video lock by the PTZ camera 104 on the POI 106.

The synchronization system synchronizes gyroscope movements between the rotorcraft 102 and the PTZ camera 104. Gyroscope synchronization between the rotorcraft's gyroscope and the PTZ (Pan-Tilt-Zoom) camera's gyroscope can allow the PTZ camera to maintain a stable visual lock on an individual in distress at the POI, despite the rotorcraft and the person experiencing frequent movements. By aligning the PTZ camera's orientation with the rotorcraft's orientation, the system enables stable and synchronized video capture throughout the rescue operation.

Image comparison methods for guiding rescue operations may be ineffective due to frequent movements caused by wind and wave dynamics. The synchronization system can ensure stable and synchronized video capture during rescue operations conducted by rotorcraft.

Figures 2A, 2B:
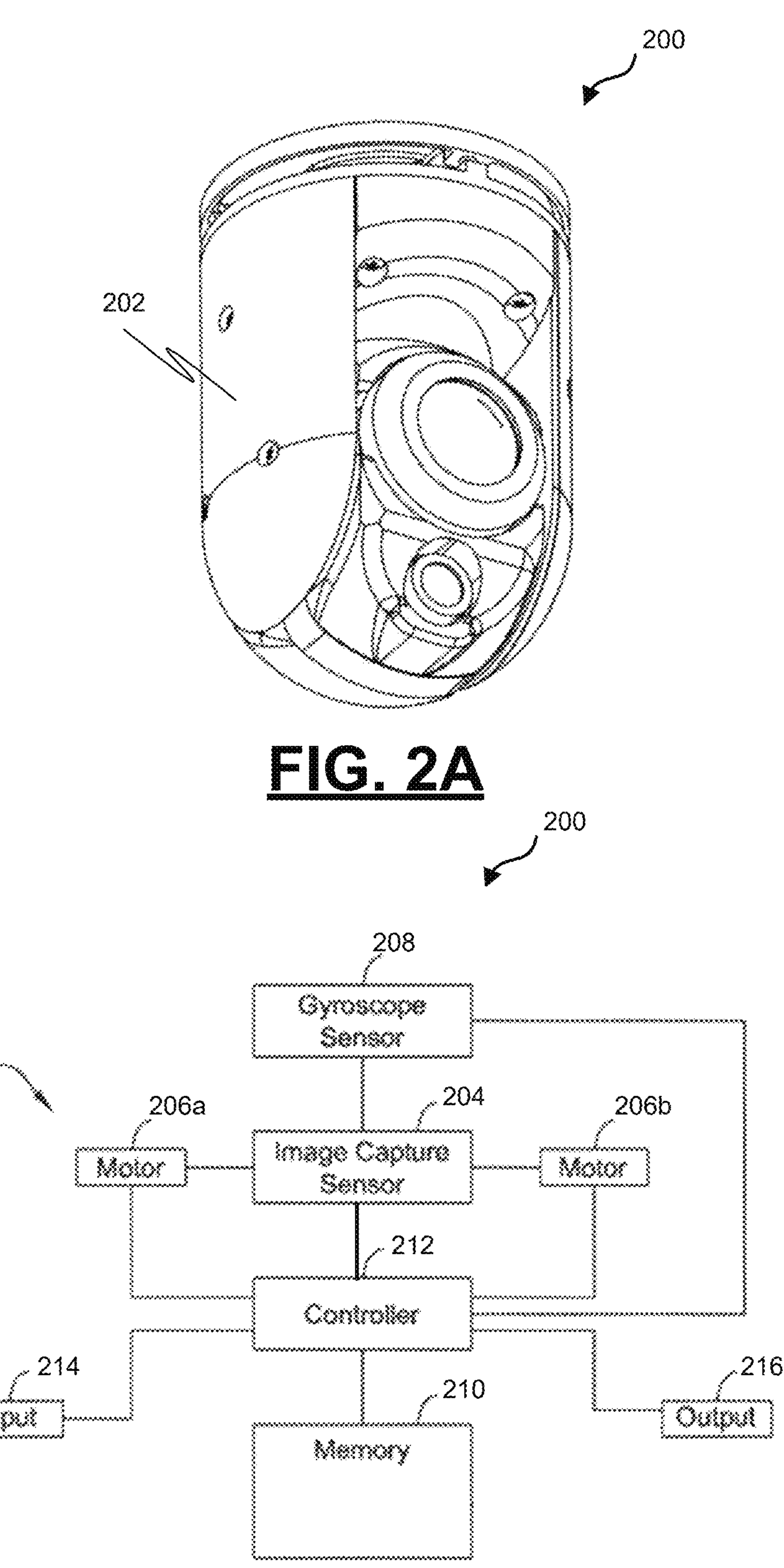
FIG. 2A is a diagram depicting an example forward looking infrared (FLIR) PTZ camera, in accordance with various embodiments.
FIG. 2B is a schematic block diagram of an example PTZ camera, showing some of the components, in accordance with various embodiments.

FIG. 2A is a diagram depicting an example forward looking infrared (FLIR) PTZ camera 200, in accordance with various embodiments. The example PTZ camera 200 may be used as part an mobile platform that is used for search and rescue operations. In various embodiments, the mobile platform could comprise: aircraft; rotorcraft such as helicopters; unmanned aerial vehicles (UAV) both remotely piloted (RPV) and autonomous; inflatable observation balloons; ground vehicles; water borne platforms; handheld sensors; etc. Likely users of embodiments of the present disclosure may include law enforcement agencies, border patrol, fire and rescue, wildfire responders, military and private security personnel. The example PTZ camera includes a housing 202 which mounts to the airborne platform.

FIG. 2B is a schematic block diagram of an example PTZ camera 200, showing some of the components that are disposed within the housing 202. The example PTZ camera 200 includes an image capture sensor 204 that is configured to capture an image of a scene. In some instances, the image capture sensor 204 includes a charge-coupled device (CCD), an active-pixel device (CMOS sensor) and/or any other suitable image capture device. In some cases, the image capture sensor may include a night vision camera, such as a Forward Looking Infrared (FLIR) sensor, a microbolometer or any other suitable night vision or infrared camera. In some instances, the image capture sensor 204 may include a camera lens adjacent to the image capture device. In some cases, the image capture sensor 204 may include a zoom motor that can drive the camera lens (sometimes through a zoom drive train) toward and away from the image capture device to achieve a desired zoom level.

The illustrative PTZ camera 200 includes one or more motors 206, individually labeled as 206*a* and 206*b*, which are configured to move the image capture sensor 204 in order to achieve a pan operation and/or a tilt operation of the image capture sensor 204. As an example, the motor 206*a* may be configured to cause the image capture sensor 204 to pan, or move left and right, and the motor 206*b* may be configured to cause the image capture sensor 204 to tilt, or move up and down. While not shown, the PTZ camera 200 may include a first drivetrain that operably connects the motor 206*a* with the image capture sensor 204 and a second drivetrain that operably connects the motor 206*b* with the image capture sensor 204. While two motors 206 are shown, in some instances the PTZ camera 200 may only include one motor. In some cases, the PTZ camera 200 may include gearing that allows a single motor 206 to both pan and tilt the image capture sensor 204. In some cases, the PTZ camera 200 may include more than two motors.

A gyroscope sensor 208 is operably coupled with the image capture sensor 204 such that the gyroscope sensor 208 is able to sense an angular data regarding the orientation of the image capture sensor 204 when the image capture sensor 204 is moved by the motor(s) 206. In some cases, the gyroscope sensor 208 may be mounted to move with the image capture sensor 204. In some instances, the gyroscope sensor 208 may be a three-axis gyroscope sensor. In some cases, the gyroscope sensor 208 may be a microelectromechanical systems (MEMS) gyroscope, a hemispherical resonator gyroscope (HRG), a vibrating structure gyroscope (VSG), a dynamically tuned gyroscope (DTG), a ring laser gyroscope, a fiber optic gyroscope, a London moment gyroscope, or any other suitable gyroscope. In some instances, the gyroscope sensor 208 may be combined with a three-axis accelerometer for even more robust direction- and motion-sensing. In some cases, the gyroscope sensor 208 may be replaced with a three-axis accelerometer.

A memory 210 is configured to store data bits and may be utilized by the controller 212 as both storage and a scratch pad. The memory locations where data bits are maintained are physical locations that have particular electrical, magnetic, optical, or organic properties corresponding to the data bits. The memory 210 can be any type of suitable computer readable storage medium. For example, the memory 210 may include various types of dynamic random access memory (DRAM) such as SDRAM, the various types of static RAM (SRAM), and the various types of non-volatile memory (PROM, EPROM, and flash).

A controller 212 is operably coupled to the image capture sensor 204, the one or more motors 206, the gyroscope sensor 208, the memory 210, the input 214, and the output 216. The input 214 and the output 216 may each represent connection ports by which information flows to and from the controller 212, respectively. Information may be received by the input 214 and may flow to the controller 212. The controller 212 may output information that flows to the output 216. In some instances, the input 214 and the output 216 may be implemented using a common communication pathway, sometimes using an Input/Output (I/O) communication protocol such as the Ethernet protocol or any other suitable protocol. It is contemplated that the common communication pathway may be a wired communication pathway or a wireless communication pathway.

The controller 212 is configured to determine PTZ camera orientation angles from the angular data from the gyroscope sensor 208 and to provide the PTZ camera orientation angles at the output 216. In various embodiments, the PTZ camera orientation angles comprise a roll angle ($\phi_c$), a pitch angle ($\theta_c$), and a yaw angle ($\psi_c$).

The controller 212 is also configured to receive, at the input 214, PTZ camera orientation angle adjustment data. In various embodiments, the PTZ camera orientation angle adjustment data includes a roll angle adjustment ($\alpha\phi_c$), a pitch angle adjustment ($\alpha\theta_c$), and a yaw angle adjustment ($\alpha\psi_c$). The controller 212 is configured to adjust the PTZ camera orientation angles based on the PTZ camera orientation angle adjustment data and PTZ camera orientation angles determined from data from the gyroscope sensor 208.

In various embodiments, the controller 212 is further configured to receive, at the input 214, PTZ camera translation adjustment data, which are based on a position change of the mobile platform on which the PTZ camera 200 is mounted. In various embodiments, the controller 212 is configured to adjust the PTZ camera orientation angles based on the PTZ camera translation adjustment data and PTZ camera orientation angles determined from data from the gyroscope sensor 208.

Figure 3:
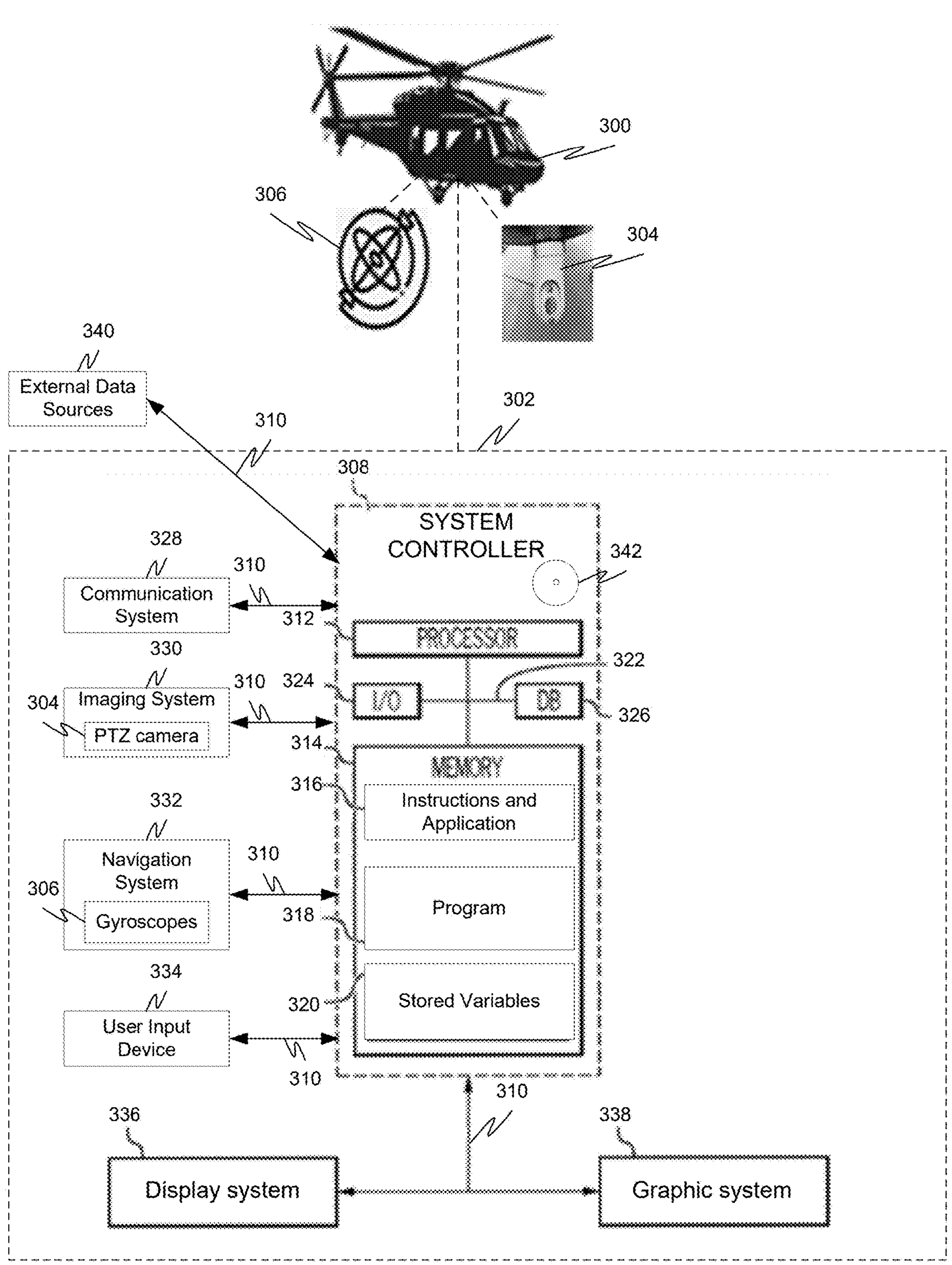
FIG. 3 is a block diagram depicting an example mobile device system on a mobile platform that includes a PTZ camera and one or more gyroscope(s), in accordance with various embodiments.

FIG. 3 is a block diagram depicting an example mobile device system 302 on a mobile platform 300 that includes a PTZ camera 304 and one or more gyroscope(s) 306 used in gyroscopic instruments on the mobile platform 300. In various embodiments, the mobile platform 300 is a rotorcraft, and is referred to as rotorcraft 300. The mobile device system 302 embodies a system controller 308 (e.g., an electronics control unit). In some embodiments, the system controller 308 may be integrated within a preexisting mobile platform management system, avionics system, cockpit display system (CDS), flight controls system (FCS), or rotorcraft flight management system (FMS). Although the system controller 308 is shown as an independent functional block onboard the rotorcraft 300, in other embodiments, it may exist in an electronic flight bag (EFB) or portable electronic device (PED), such as a tablet, cellular phone, or the like. The system controller 308 may be operationally coupled to a plurality of the following mobile platform systems: a communication system and fabric 310, a communication system 328, an imaging system 330, a navigation system 332, a user input device 334, a display system 336, and a graphics system 338. The operation of these functional blocks is described in more detail below.

In various embodiments, the communications system and fabric 310 is configured to support instantaneous (i.e., real time or current) communications between on-board systems, such as the gyroscope(s) 306 and the PTZ camera 304, the system controller 308, and one or more external data source(s). The communications system and fabric 310 may incorporate one or more transmitters, receivers, and the supporting communications hardware and software required for components of the mobile device system 302 to communicate as described herein.

The communication system 328 is configured to support communications between external data source(s) 340 and the aircraft. External source(s) 340 may comprise air traffic control (ATC), or other suitable command centers and ground locations. Data received from the external source(s) 340 includes the instantaneous, or current, visibility report associated with a target landing location or identified runway. In this regard, the communication system 328 may be realized using a radio communication system or another suitable data link system.

The imaging system 330 is configured to use sensing devices to generate video or still images and provide image data therefrom. The imaging system 330 may comprise one or more sensing devices, such as cameras, each with an associated sensing method. Accordingly, the video or still images generated by the imaging system 330 may be referred to herein as generated images, sensor images, or sensed images, and the image data may be referred to as sensed data. The imaging system 330 may use various types of imaging sensors, including: a forward looking infrared (FLIR) sensor; a radio detection and ranging (RADAR) sensor; a light detection and ranging (LIDAR) sensor; a sound navigation and ranging (SONAR) sensor; a night vision light amplification sensor; a standard long range camera sensor; a low-light TV camera, or a millimeter wave (MMW) video camera. The imaging system 330 uses methods other than visible light to generate images, and the sensing devices within the imaging system 330 can be much more sensitive than a human eye. Consequently, the generated images may comprise objects, such as mountains, buildings, or ground objects, that a pilot might not otherwise see due to low visibility conditions.

In various embodiments, the imaging system 330 includes the PTZ camera 304. The example PTZ camera 304 includes gyroscopes for measuring the orientation of the PTZ camera 304 and controls for receiving roll angle, pitch angle, and yaw angle inputs for controlling the orientation of the PTZ camera 304. In an embodiment, the orientation is measured in Euler angles.

The PTZ camera 304 is configured to capture images of a POI, for example during a search and rescue mission, and to supply image data representative of the captured images to the system controller 308. The system controller 308 is further configured to process the image data and at least selectively command the display system 336 to render the captured images.

In various embodiments, the imaging system 330 may be mounted in or near the nose of the mobile platform 300 and calibrated to align an imaging region with a viewing region of a primary flight display (PFD) or a Head Up display (HUD) rendered on the display system 336. For example, the imaging system 330 may be configured so that a geometric center of its field of view (FOV) is aligned with or otherwise corresponds to the geometric center of the viewing region on the display system 336. In this regard, the imaging system 330 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 336 are three dimensional, and the imaging system 330 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 332, or other aircraft and/or flight management systems.

The navigation system 332 is configured to provide real-time navigational data and/or information regarding operation of the aircraft. The navigation system 332 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 332, as will be appreciated in the art. The navigation system 332 is capable of obtaining and/or determining the current or instantaneous position and location information of the aircraft (e.g., the current latitude and longitude) and the current altitude or above ground level for the aircraft. Additionally, in an exemplary embodiment, the navigation system 332 includes inertial reference sensors capable of obtaining or otherwise determining the attitude or orientation (e.g., the pitch, roll, and yaw, heading) of the aircraft relative to earth. In various embodiments, the inertial reference sensors include gyroscopes 306.

In some embodiments, real-time rotorcraft state data is generated by the gyroscope(s) 306. Real-time rotorcraft state data may include any of the instantaneous orientation angles (roll angle, pitch angle, and yaw angle) of the rotorcraft 300. As used herein, "real-time" is interchangeable with current and instantaneous. The rotorcraft gyroscope(s) 306 may be embodied in gyroscopic instruments such as, an attitude indicator, heading indicator, turn coordinator, and/or others. The real-time rotorcraft state data is made available, generally by way of the communication system and fabric 310.

The user input device 334 is coupled to the system controller 308, and the user input device 334 and the system controller 308 are cooperatively configured to allow a user (e.g., a pilot, co-pilot, or crew member) to interact with the display system 336 and/or other elements of the mobile platform 300 in a conventional manner. The user input device 334 may include any one, or combination, of various known user input device devices including, but not limited to: a touch sensitive screen; a cursor control device (CCD), such as a mouse, a trackball, or joystick; a keyboard; one or more buttons, switches, or knobs; a voice input system; and a gesture recognition system. In embodiments using a touch sensitive screen, the user input device 334 may be integrated with a display device. Non-limiting examples of uses for the user input device 334 include: entering values for stored variables 320, loading or updating instructions and applications 316, and loading and updating the contents of the database 326, each described in more detail below.

The display system 336 may include any device or apparatus suitable for displaying flight information or other data associated with operation of the mobile platform 300 in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 336 may be part of, or include, a primary flight display (PFD) system, a panel-mounted head down display (HDD), a head up display (HUD), or a head mounted display system, such as a "near to eye display" system. The display system 336 may comprise display devices that provide three dimensional or two dimensional images and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology The generated images from the imaging system 330 are provided to the system controller 308 in the form of image data. The system controller 308 is configured to receive the image data and convert and render the image data into display commands that command and control the renderings of the display system 336. This conversion and rendering may be performed, at least in part, by the graphics system 338. In some embodiments, the graphics system 338 may be integrated within the system controller 308; in other embodiments, the graphics system 338 may be integrated within the display system 336. Regardless of the state of integration of these subsystems, responsive to receiving display commands from the system controller 308, the display system 336 displays, renders, or otherwise conveys one or more graphical representations or displayed images based on the image data (i.e., sensor based images) and associated with operation of the mobile platform 300, as described in greater detail below. In various embodiments, images displayed on the display system 336 may also be responsive to processed user input that was received via a user input device 334.

In various embodiments, the system controller 308, alone, or as part of a central management computer (CMC) or a flight management system (FMS), draws upon data and information from the gyroscope(s) 306 to synchronize the PTZ camera gyroscopes with the gyroscope(s) 306. In various embodiments, the system controller 308 is configured to receive rotorcraft orientation angles including a roll angle, a pitch angle, and a yaw angle from one or more gyroscope(s) 306 on the rotorcraft; receive PTZ camera orientation angles including a PTZ camera roll angle, a PTZ camera pitch angle, and a PTZ camera yaw angle from the PTZ camera 304; calculate an error between the rotorcraft orientation angles and the PTZ camera orientation angles; generate PTZ camera orientation angle adjustment data based on the error between the rotorcraft orientation angles and the PTZ camera orientation angles; and provide the PTZ camera orientation angle adjustment data to the PTZ camera 304 for use by the PTZ camera 304 to adjust PTZ camera orientation angles. In some embodiments, the system controller 308 is configured to: receive rotorcraft orientation angles including a roll angle, a pitch angle, and a yaw angle from one or more gyroscope(s) on the rotorcraft while the rotorcraft is moving toward a target; receive PTZ camera orientation angles including a PTZ camera roll angle, a PTZ camera pitch angle, and a PTZ camera yaw angle from the PTZ camera while the PTZ camera is locked onto the target; calculate an error between the rotorcraft orientation angles and the PTZ camera orientation angles; generate rotorcraft orientation angle correction data for correcting rotorcraft orientation angles for landing at a target; generate rotorcraft lateral distance correction data for correcting a lateral distance required for vertical landing at the target; and provide the rotorcraft orientation angle correction data and the rotorcraft lateral distance correction data to the rotorcraft for use by the rotorcraft to align the rotorcraft to a path to the target The system controller 308 performs the functions of the mobile device system 302. The system controller 308 is depicted as a processing component such as a controller. The processing component comprises at least one processor 312 and a computer-readable storage device or media (such as memory 314) encoded with programming instructions for configuring the processing component. Within the system controller 308, the processor 312 and the memory 314 (having therein a program 318) form a novel synchronization engine that performs the described processing activities in accordance with the program 318, as is described in more detail below. The system controller 308 generates display signals that command and control the display system 336.

The processor 312 may comprise any type of processor or multiple processors, any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions to carry out the described operations, tasks, and functions by manipulating electrical signals representing data bits at memory locations in system memory, as well as other processing of signals.

The memory locations where data bits are maintained are physical locations that have particular electrical, magnetic, optical, or organic properties corresponding to the data bits. The memory 314 can be any type of suitable computer readable storage medium. For example, the memory 314 may include various types of dynamic random access memory (DRAM) such as SDRAM, the various types of static RAM (SRAM), the various types of non-volatile memory (PROM, EPROM, EEPROM, flash memory, or any other electric, magnetic, optical, or combination memory devices capable of storing data, some of which represent executable programming instructions, used by the processing component), and keep-alive memory (KAM), for example. KAM is a persistent or non-volatile memory that may be used to store various operating variables while the processor is powered down.

In certain examples, the memory 314 is located on and/or co-located on the same computer chip as the processor 312. Generally, the memory 314 maintains data bits and may be utilized by the processor 312 as storage and/or a scratch pad during operation. Specifically, the memory 314 stores instructions and applications 316, programs 318, and stored variables 320. Information in the memory 314 may be organized and/or imported from an external source during an initialization step of a process; it may also be programmed via the user input device 334.

During operation, the processor 312 loads and executes one or more programs, algorithms and rules embodied as instructions and applications 316 contained within the memory 314 and, as such, controls the general operation of the system controller 308 as well as the mobile device system 302. In executing the process described herein, the processor 312 specifically loads and executes the novel program 318. Additionally, the processor 312 is configured to process received inputs (any combination of input from the communication system 328, the imaging system 330, the navigation system 332, and user input provided via user input device 334), reference the database 326 in accordance with the program 318, and generate display commands that command and control the display system 336 based thereon.

The program 318 include rules and instructions that, when executed, convert the controller 308 (e.g., processor 312/memory 314) configuration into a synchronization module that performs the functions, techniques, and processing tasks associated with synchronizing orientation angles of the rotorcraft gyroscopes 306 with orientation angles of the gyroscopes of the PTZ camera 304 for the mobile device system 302.

In various embodiments, the synchronization module is configured to: receive rotorcraft orientation angles including a roll angle, a pitch angle, and a yaw angle from one or more gyroscope(s) 306 on the mobile platform 300; receive PTZ camera orientation angles including a PTZ camera roll angle, a PTZ camera pitch angle, and a PTZ camera yaw angle from the PTZ camera; calculate an error between the rotorcraft orientation angles and the PTZ camera orientation angles; generate PTZ camera orientation angle adjustment data based on the error between the rotorcraft orientation angles and the PTZ camera orientation angles; and provide the PTZ camera orientation angle adjustment data to the PTZ camera 304 for use by the PTZ camera 304 to adjust PTZ camera orientation angles; wherein the PTZ camera 304 is configured to adjust the PTZ camera orientation angles based on the PTZ camera orientation angle adjustment data.

In some embodiments, to generate PTZ camera orientation angle adjustment data the synchronization module is configured to use a feedback control algorithm to generate PTZ camera orientation angle adjustment data based on the error between the rotorcraft orientation angles and the PTZ camera orientation angles. In some embodiments, the feedback control algorithm utilizes a proportional feedback control algorithm to generate PTZ camera orientation angle adjustment data. In some embodiments, the feedback control algorithm utilizes a PID feedback control algorithm to generate PTZ camera orientation angle adjustment data.

In some embodiments, the error between the rotorcraft orientation angles and the PTZ camera orientation angles includes a roll angle error measurement, a pitch angle error measurement, and a yaw angle error measurement. In some embodiments, the roll angle error measurement is equal to rotorcraft gyroscope roll angle minus the PTZ camera roll angle; the pitch angle error measurement is equal to rotorcraft gyroscope pitch angle minus the PTZ camera pitch angle; and the yaw angle error measurement is equal to rotorcraft gyroscope yaw angle minus the PTZ camera yaw angle. In some embodiments, a PTZ camera orientation angle adjustment is equal to a proportional gain times the error between the rotorcraft orientation angles and the PTZ camera orientation angles. In some embodiments, a PTZ camera orientation angle adjustment is equal to a proportional gain times the error between the rotorcraft orientation angles and the PTZ camera orientation angles, a derivative gain times a derivative of the error, and an integral gain times an integral of the error. In some embodiments, a PTZ camera orientation angle adjustment includes a roll angle adjustment, a pitch angle adjustment, and a yaw angle adjustment. In some embodiments, the roll angle adjustment is calculated based on a first proportional gain component $K_p$1 times a roll angle error measurement; the pitch angle adjustment is calculated based on a second proportional gain component $K_p$2 times a pitch angle error measurement; and the yaw angle adjustment is calculated based on a third proportional gain component $K_p$3 times a yaw angle error measurement.

In some embodiments, the synchronization module is further configured to: receive a change in XYZ coordinate position of the rotorcraft; calculate PTZ coordinate adjustment data for the PTZ camera based on the change in XYZ coordinate position of the rotorcraft; and provide the PTZ coordinate adjustment data to the PTZ camera; wherein the PTZ camera is configured to adjust the PTZ camera orientation angles based on the PTZ coordinate adjustment data. In some embodiments, the PTZ coordinate adjustment data includes an x-direction adjustment measurement, a y-direction adjustment measurement, and a z-direction adjustment measurement. In some embodiments, the x-direction adjustment measurement is equal to a change in rotorcraft x-direction position; the y-direction adjustment measurement is equal to a change in rotorcraft y-direction position; and the z-direction adjustment measurement is equal to a change in rotorcraft z-direction position.

In various embodiments, the synchronization module is configured to: receive rotorcraft orientation angles including a roll angle, a pitch angle, and a yaw angle from one or more gyroscope(s) 306 on the mobile platform 300; receive PTZ camera orientation angles including a PTZ camera roll angle, a PTZ camera pitch angle, and a PTZ camera yaw angle from the PTZ camera; calculate an error between the rotorcraft orientation angles and the PTZ camera orientation angles; generate rotorcraft orientation angle correction data for correcting rotorcraft orientation angles for landing at a target and/or generate rotorcraft lateral distance correction data for correcting a lateral distance required for vertical landing at the target; and provide the rotorcraft orientation angle correction data and the rotorcraft lateral distance correction data to the rotorcraft for use by the rotorcraft to align the rotorcraft to a path to the target.

The program 318 may be stored in a functional form on computer readable media, for example, as depicted, in memory 314. While the depicted exemplary embodiment of the system controller 308 is described in the context of a fully functioning computer system, those skilled in the art will recognize that the mechanisms of the present disclosure are capable of being distributed as a program product.

As a program product, one or more types of non-transitory computer-readable signal bearing media may be used to store and distribute the program 318, such as a non-transitory computer readable medium bearing the program 318 and containing therein additional computer instructions for causing a computer processor (such as the processor 312) to load and execute the program 318. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory 314 and as program product time-based viewing of clearance requests in certain embodiments.

In the depicted embodiment, the memory 314 stores instructions and applications 316, and program 318, along with one or more configurable variables in stored variables 320. The database 326 and the disk 342 are computer readable storage media in the form of any suitable type of storage apparatus, including direct access storage devices such as hard disk drives, flash systems, floppy disk drives and optical disk drives. The database 326 may include an airport database (comprising airport features) and a terrain database (comprising terrain features). In combination, the features from the airport database and the terrain database are referred to map features. Information in the database 326 may be organized and/or imported from an external source 340 during an initialization step of a process.

In various embodiments, the controller (e.g., processor 312/memory 314) configuration of the system controller 308 may be communicatively coupled (via a bus 322) to an input/output (I/O) interface 324, and a database 326. The bus 322 serves to transmit programs, data, status and other information or signals between the various components of the system controller 308. The bus 322 can be any suitable physical or logical means of connecting computer systems and components. This includes, but is not limited to, direct hard-wired connections, fiber optics, infrared and wireless bus technologies.

The I/O interface 324 enables communications with the system controller 308, as well as communications between the system controller 308 and other mobile vehicle components, and between the system controller 308 and the external data sources via the communication system and fabric 310. The I/O interface 324 may include one or more network interfaces and can be implemented using any suitable method and apparatus. In various embodiments, the I/O interface 324 is configured to support communication from an external system driver and/or another computer system. In one embodiment, the I/O interface 324 is integrated with the communication system and fabric 310 and obtains data from external data source(s) directly. Also, in various embodiments, the I/O interface 324 may support communication with technicians, and/or one or more storage interfaces for direct connection to storage apparatuses, such as the database 326. In some embodiments, the database 326 is part of the memory 314. In various embodiments, the database 326 is integrated, either within the system controller 308 or external to it.

It will be appreciated that the mobile device system 302 may differ from the embodiment depicted in FIG. 3. As mentioned, the mobile device system 302 can be integrated with an existing flight management system (FMS) or aircraft flight deck display.

Figure 4:
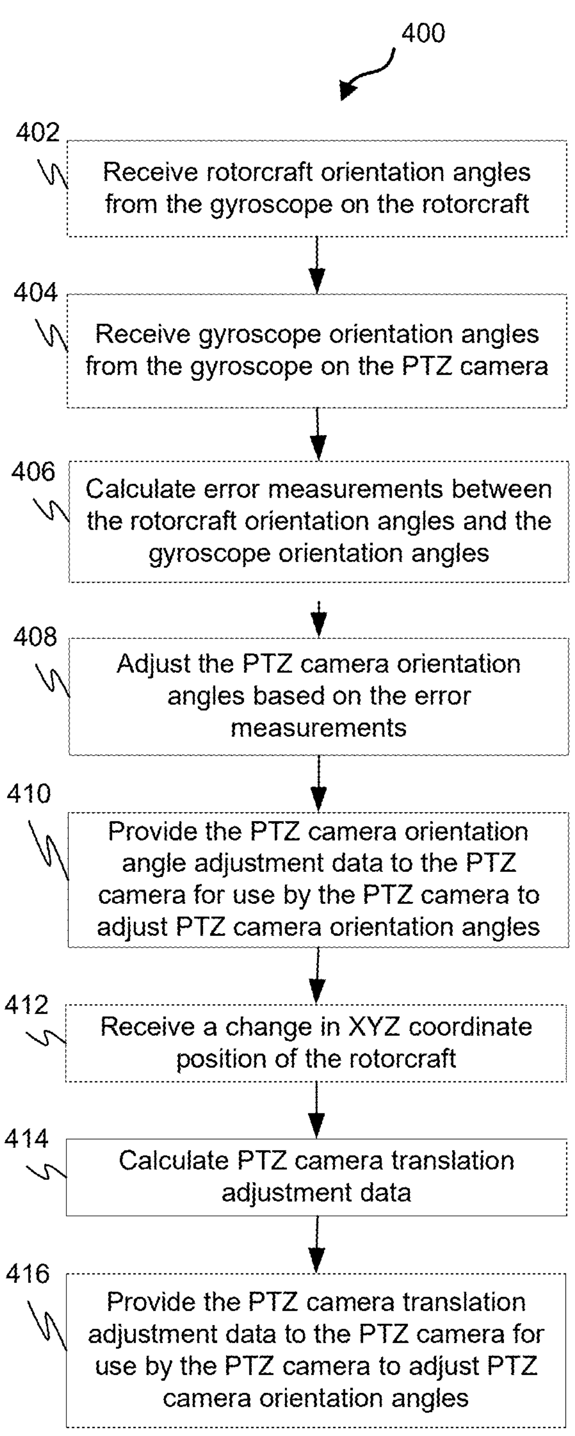
FIG. 4 is a process flow chart depicting an example process for synchronizing a gyroscope on a pan-tilt-zoom (PTZ) camera to a gyroscope on a rotorcraft, in accordance with various embodiments.

FIG. 4 is a process flow chart depicting an example process 400 for synchronizing a gyroscope on a pan-tilt-zoom (PTZ) camera to a gyroscope on a rotorcraft. The process 400 is merely an example and is not intended to limit the present disclosure beyond what is explicitly recited in the claims. Additional steps may be provided before, during, and after process 400, and some of the steps described can be moved, replaced, or eliminated for additional embodiments of process 400.

At operation 402, the example process 400 includes receiving rotorcraft orientation angles from the gyroscope on the rotorcraft. In various embodiments, the orientation angles comprise a roll angle ($\phi_r$), a pitch angle ($\theta_r$), and a yaw angle ($\psi_r$).

At operation 404, the example process 400 includes receiving gyroscope orientation angles from the gyroscope on the PTZ camera. In various embodiments, the orientation angles comprise a roll angle ($\phi_c$), a pitch angle ($\theta_c$), and a yaw angle ($\psi_c$).

At operation 406, the example process 400 includes calculating error measurements between the rotorcraft orientation angles and the gyroscope orientation angles. In various embodiments, the error measurements comprise a roll angle error measurement ($\Delta\phi_c$), a pitch angle error measurement ($\Delta\theta_c$), and a yaw angle error measurement ($\Delta\psi_c$). In various embodiments, the roll angle error measurement ($\Delta\phi_c$) is equal to rotorcraft gyroscope roll angle ($\phi_r$) minus the PTZ camera roll angle ($\phi_c$), i.e., $\Delta\phi_c=\phi_r-\phi_c$. In various embodiments, the pitch angle error measurement ($\Delta\theta_c$), is equal to rotorcraft gyroscope pitch angle ($\theta_r$) minus the PTZ camera pitch angle ($\theta_c$), i.e., $\Delta\theta_c=\theta_r-\theta_c$. In various embodiments, the yaw angle error measurement ($\Delta\psi_c$) is equal to rotorcraft gyroscope yaw angle ($\psi_r$) minus the PTZ camera yaw angle ($\psi_c$), i.e., $\Delta\psi_c=\psi_r-\psi_c$. In various embodiments, the error measurements between the rotorcraft orientation angles and the gyroscope orientation angles are $(\Delta\phi_c, \Delta\theta_c, \Delta\psi_c)=(\phi_r-\phi_c, \theta_r-\theta_c, \psi_r-\psi_c)$.

At operation 408, the example process 400 includes adjusting the PTZ camera orientation angles based on the error measurements. In various embodiments, adjusting the PTZ camera orientation angles comprises calculating PTZ camera orientation angle adjustment data. In various embodiments, adjusting the PTZ camera orientation angles comprises generating PTZ orientation adjustment data using a feedback control algorithm based on the error between the rotorcraft orientation angles and the PTZ camera orientation angles. In some embodiments, the feedback control algorithm utilizes a proportional feedback control algorithm to generate PTZ camera orientation angle adjustment data. In some embodiments, the feedback control algorithm utilizes a PID feedback control algorithm to generate PTZ camera orientation angle adjustment data.

In various embodiments, the PTZ camera orientation angle adjustment is equal to a proportional gain times the orientation angle error i.e., $K_p(\Delta\phi_c, \Delta\theta_c, \Delta\psi_c)$, wherein $K_p$ is the proportional gain. In some embodiments, the PTZ camera orientation angle adjustment is equal to a proportional gain ($K_p$) times the error between the rotorcraft orientation angles and the PTZ camera orientation angles, a derivative gain ($K_d$) times a derivative of the error, and an integral gain ($K_i$) times an integral of the error. In various embodiments, the proportional gain $K_p$ includes a first proportional gain component $K_{p1}$, a second proportional gain $K_{p2}$, and a third proportional gain component $K_{p3}$. In various embodiments, the PTZ camera orientation angle adjustment includes a roll angle adjustment ($\alpha\phi_c$), a pitch angle adjustment ($\alpha\theta_c$), and a yaw angle adjustment ($\alpha\psi_c$). In various embodiments, the roll angle adjustment ($\alpha\phi_c$) is calculated based on the first proportional gain component $K_{p1}$ times the roll angle error ($\phi_r-\phi_c$), e.g., $\alpha\phi_c=K_{p1}(\phi_r-\phi_c)$. In various embodiments, the pitch angle adjustment ($\alpha\theta_c$) is calculated based on the second proportional gain component $K_{p2}$ times the pitch angle error ($\theta_r-\theta_c$), e.g., $\alpha\theta_c=K_{p2}(\theta_r-\theta_c)$. In various embodiments, the yaw angle adjustment ($\alpha\psi_c$) is calculated based on the third proportional gain component $K_{p3}$ times the yaw angle error ($\psi_r-\psi_c$), e.g., $\alpha\psi_c=K_{p3}(\psi_r-\psi_c)$.

At operation 410, the example process 400 includes providing the PTZ camera orientation angle adjustment data to the PTZ camera for use by the PTZ camera to adjust PTZ camera orientation angles. In various embodiments, the PTZ camera is configured to adjust the PTZ camera orientation angles based on the PTZ camera orientation angle adjustment data.

In various embodiments, a controller in the PTZ camera (e.g., controller 212) is configured to receive the PTZ camera orientation angle adjustment data. In various embodiments, the controller in the PTZ camera is configured to adjust the PTZ camera orientation angles based on the PTZ camera orientation angle adjustment data and PTZ camera orientation angles determined from data from a gyroscope sensor in the in the PTZ camera.

At operation 412, the example process 400 includes receiving a change in XYZ coordinate position of the rotorcraft. In various embodiments, the change in XYZ coordinate position of the rotorcraft can be determined from rotorcraft sensors that measure position, such as GPS sensors.

At operation 414, the example process 400 includes calculating PTZ camera translation adjustment data ($\Delta x_c$, $\Delta y_c$, $\Delta z_c$). In various embodiments, the translation adjustment data ($\Delta x_c$, $\Delta y_c$, $\Delta z_c$) comprise an x-direction adjustment measurement ($\Delta x_c$), a y-direction adjustment measurement ($\Delta y_c$), and a z-direction adjustment measurement ($\Delta z_c$). In various embodiments, the x-direction adjustment measurement ($\Delta x_c$) is equal to a change in rotorcraft x-direction position ($\Delta x_r$). In various embodiments, the y-direction adjustment measurement ($\Delta y_c$) is equal to a change in rotorcraft y-direction position ($\Delta y_r$). In various embodiments, the z-direction adjustment measurement ($\Delta z_c$) is equal to a change in rotorcraft z-direction position ($\Delta z_r$). In various embodiments, the change in rotorcraft x-direction position ($\Delta x_r$), rotorcraft y-direction position ($\Delta y_r$), and rotorcraft z-direction position ($\Delta z_r$) can be determined from rotorcraft sensors that measure rotorcraft positions, such as GPS.

At operation 416, the example process 400 includes providing the PTZ camera translation adjustment data to the PTZ camera for use by the PTZ camera to adjust PTZ camera orientation angles. In various embodiments, the PTZ camera is configured to adjust the PTZ camera orientation angles based on the PTZ camera translation adjustment data.

In various embodiments, the controller in the PTZ camera (e.g., controller 212) is further configured to receive the PTZ camera translation adjustment data. In various embodiments, the controller in the PTZ camera is configured to adjust the PTZ camera orientation angles based on the PTZ camera translation adjustment data and PTZ camera orientation angles determined from data from a gyroscope sensor in the PTZ camera.

Figures 5A, 5B, 5C, 5D:
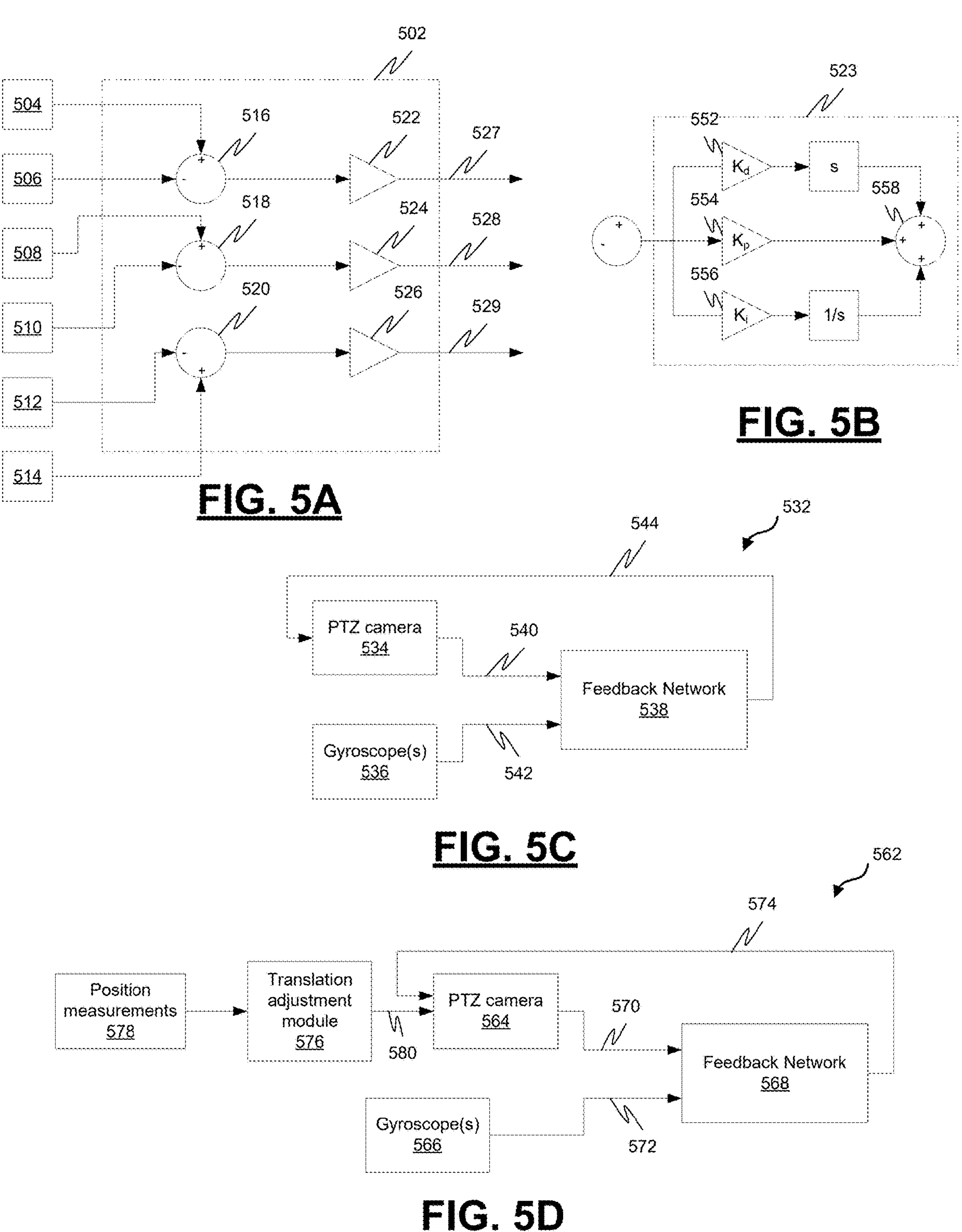
FIG. 5A is a block diagram depicting an example feedback network for an example synchronization system, in accordance with various embodiments.
FIG. 5B is a block diagram illustrating that a first amplifier, second amplifier, and third amplifier of FIG. 5A may be implemented using PID control, in accordance with various embodiments.
FIG. 5C is a block diagram depicting an example synchronization system, in accordance with various embodiments.
FIG. 5D is a block diagram depicting another example synchronization system, in accordance with various embodiments.

FIG. 5A is a block diagram depicting an example feedback network 502 for an example synchronization system. The example feedback network 502 is configured to continuously monitor the position and orientation of the rotorcraft and adjust the PTZ camera orientation accordingly to maintain a stable visual lock. The example feedback network 502 includes a first summer stage 516, a second summer stage 518, a third summer stage 520, a first amplifier 522, a second amplifier 524, and a third amplifier 526.

A rotorcraft roll angle 504 ($\phi_r$) is summed at the first summer stage 516 with a camera roll angle 506 ($\phi_c$) from a PTZ camera. A rotorcraft pitch angle 508 ($\theta_r$) is summed at the second summer stage 518 with a camera pitch angle 510 ($\theta_c$) from the PTZ camera. A rotorcraft yaw angle 512 ($\psi_r$) is summed at the third summer stage 520 with a camera yaw angle 514 ($\psi_c$) from the PTZ camera.

A first proportional gain component ($K_{p1}$) is multiplied with the output of the first summer stage 516 (e.g., roll angle error measurement ($\Delta\phi_c$)) at the first amplifier 522. A second proportional gain component ($K_{p2}$) is multiplied with the output of the second summer stage 518 (e.g., pitch angle error measurement ($\Delta\theta_c$)) at the second amplifier 524. A third proportional gain component ($K_{p3}$) is multiplied with the output of the third summer stage 520 (e.g., yaw angle error measurement ($\Delta\psi_c$)) at the third amplifier 526. The output 527 of the first amplifier 522 (e.g., roll angle adjustment ($\alpha\phi_c$)), the output 528 of the second amplifier 524 (e.g., pitch angle adjustment ($\alpha\theta$c)), and the output 529 of the third amplifier 526 (e.g., yaw angle adjustment ($\alpha\psi$c)) are fed back to the PTZ camera as PTZ camera orientation angle adjustments.

FIG. 5B is a block diagram illustrating that the first amplifier 522, second amplifier 524, and third amplifier 526 may be implemented using PID control. The first amplifier 522 of FIG. 5A may be replaced by a PID control stage 523 wherein the output of the first summer stage 516 (e.g., roll angle error measurement ($\Delta\phi_c$)) is multiplied by a proportional gain ($K_p$) at a first amplifier 552, multiplied by a derivative gain ($K_d$) at a second amplifier 554, and multiplied by an integral gain ($K_i$) at a third amplifier 556. A derivative of the output of the second amplifier 554, an integral of the output of the third amplifier 556, and the output of the first amplifier 552 are summed at a summer 558 yielding a roll angle adjustment ($\alpha\phi_c$) as an output.

Similarly, the second amplifier 524 of FIG. 5A may be replaced by the PID control stage 523 wherein the output of the second summer stage 518 (e.g., pitch angle error measurement ($\Delta\theta_c$)) is multiplied by a proportional gain ($K_p$) at a first amplifier 552, multiplied by a derivative gain ($K_d$) at a second amplifier 554, and multiplied by an integral gain ($K_i$) at a third amplifier 556. A derivative of the output of the second amplifier 554, an integral of the output of the third amplifier 556, and the output of the first amplifier 552 are summed at a summer 558 yielding a pitch angle adjustment ($\alpha\theta$c) as an output.

Likewise, the third amplifier 526 of FIG. 5A may be replaced by the PID control stage 523 wherein the output of the third summer stage 520 (e.g., yaw angle error measurement ($\Delta\psi_c$)) is multiplied by a proportional gain ($K_p$) at a first amplifier 552, multiplied by a derivative gain ($K_d$) at a second amplifier 554, and multiplied by an integral gain ($K_i$) at a third amplifier 556. A derivative of the output of the second amplifier 554, an integral of the output of the third amplifier 556, and the output of the first amplifier 552 are summed at a summer 558 yielding a yaw angle adjustment ($\alpha\psi c$)) as an output.

FIG. 5C is a block diagram depicting an example synchronization system 532. The example synchronization system 532 includes a PTZ camera 534 on a rotorcraft, one or more gyroscope(s) 536 on the rotorcraft, and a feedback network 538 (e.g., feedback network 502). The PTZ camera 534 provides camera orientation angles 540 (e.g., roll angle ($\phi_c$), pitch angle ($\theta_c$), and yaw angle ($\psi_c$)) to the feedback network 538. The one or more gyroscope(s) 536 provide rotorcraft orientation angles 542 (e.g., roll angle ($\phi_r$), pitch angle ($\theta_r$), and yaw angle ($\psi_r$)) to the feedback network 538. The feedback network 538 calculates PTZ camera orientation angle adjustment data 544 (e.g., roll angle adjustment ($\alpha\phi_c$), pitch angle adjustment ($\alpha\theta_c$), and yaw angle adjustment ($\alpha\psi_c$)) that is provided to the PTZ camera 534. The PTZ camera 534 is configured to adjust PTZ camera orientation angles based on the PTZ camera orientation angle adjustment data 544.

FIG. 5D is a block diagram depicting another example synchronization system 562. The example synchronization system 562 includes a PTZ camera 564 on a rotorcraft, one or more gyroscope(s) 566 on the rotorcraft, and a feedback network 568 (e.g., feedback network 502). The PTZ camera 564 provides camera orientation angles 570 (e.g., roll angle ($\phi_c$), pitch angle ($\theta_c$), and yaw angle ($\psi_c$)) to the feedback network 568. The one or more gyroscope(s) 566 provide rotorcraft orientation angles 572 (e.g., roll angle ($\phi_r$), pitch angle ($\theta_r$), and yaw angle ($\psi_r$)) to the feedback network 568. The feedback network 568 calculates PTZ camera orientation angle adjustment data 574 (e.g., roll angle adjustment ($\alpha\phi_c$), pitch angle adjustment ($\alpha\theta_c$), and yaw angle adjustment ($\alpha\psi_c$)) that is provided to the PTZ camera 564. The PTZ camera 564 is configured to adjust PTZ camera orientation angles based on the PTZ camera orientation angle adjustment data 574.

The example synchronization system 562 includes a translation adjustment module 576 that receives position measurement data 578 (e.g., change in rotorcraft x-direction position ($\Delta x_r$), change in rotorcraft y-direction position ($\Delta y_r$), and change in rotorcraft z-direction position ($\Delta z_r$)) from rotorcraft sensors, such as GPS, and translates the position measurement data 578 into PTZ camera translation adjustment data 580 ($\Delta x_c$, $\Delta y_c$, $\Delta z_c$) that is provided to the PTZ camera 564. The PTZ camera 564 is configured to adjust PTZ camera orientation angles based on the PTZ camera translation adjustment data 580.

Figure 6:
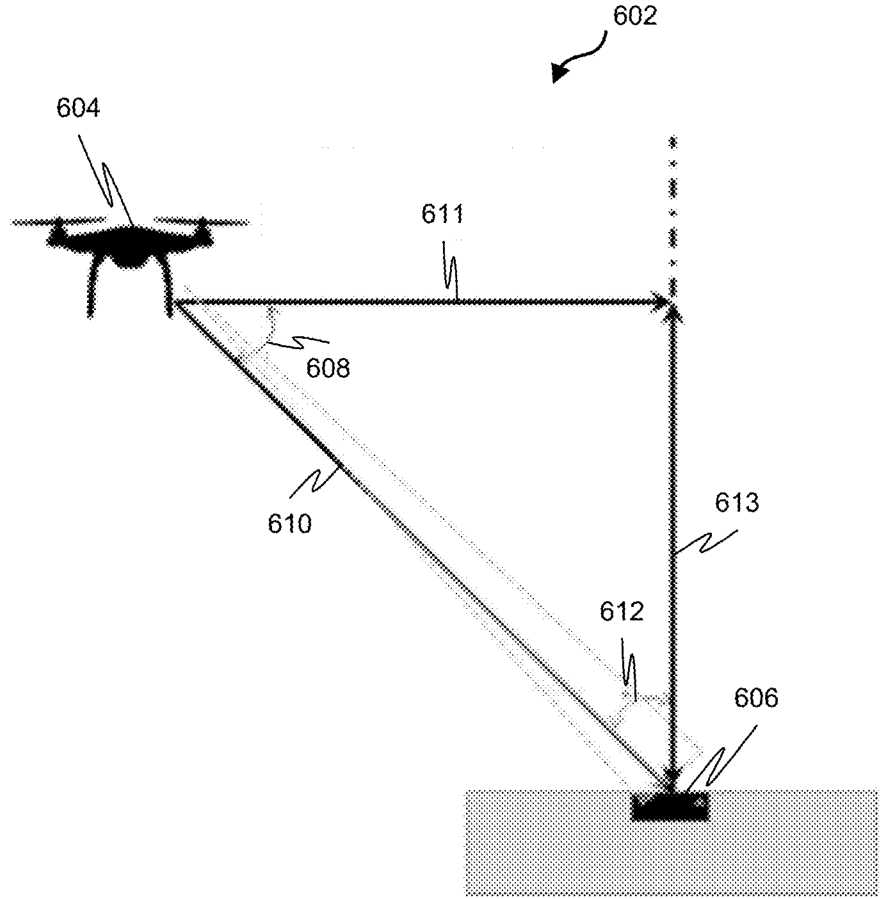
FIG. 6 is a block diagram depicting an example operating environment for a synchronization system, in accordance with various embodiments.

FIG. 6 is a block diagram depicting an example operating environment 602 for a synchronization system (not shown). In this example, the synchronization system synchronizes rotorcraft gyroscope orientation angles with PTZ camera orientation angles. Depicted are a rotorcraft 604 and a target 606. A PTZ camera on the rotorcraft 604 is locked onto the target 606. A PTZ camera orientation angle 608 is defined between a sight line 610 from the rotorcraft 604 to the target 606 and a horizontal line 611 at the altitude of the rotorcraft 604. An angle of incidence 612 is defined between the sight line 610 from the rotorcraft 604 to the target 606 and a vertical line 613 from the target 606. The synchronization system in the rotorcraft is configured to obtain rotorcraft orientation angles comprising a roll angle ($\phi_r$), a pitch angle ($\theta_r$), and a yaw angle ($\psi_r$) from a gyroscope on the rotorcraft while the rotorcraft is moving toward the target; obtain PTZ camera orientation angles comprising a roll angle ($\phi_c$), a pitch angle ($\theta_c$), and a yaw angle ($\psi_c$) from a gyroscope on the PTZ camera while the PTZ camera is locked onto the target; and calculate an error between the rotorcraft orientation angles and the PTZ camera orientation angles. The synchronization system in the rotorcraft is further configured to generate rotorcraft orientation angle correction data for correcting rotorcraft orientation angles for landing at a target; and/or generate rotorcraft lateral distance correction data for correcting a lateral distance required for vertical landing at the target, for example, using a feedback control algorithm based on the error between the rotorcraft orientation angles and the PTZ camera orientation angles. The synchronization system in the rotorcraft is also configured to provide the rotorcraft orientation angle correction data and/or the rotorcraft lateral distance correction data to the rotorcraft for use by the rotorcraft to align the rotorcraft to a path to the target.

Figure 7:
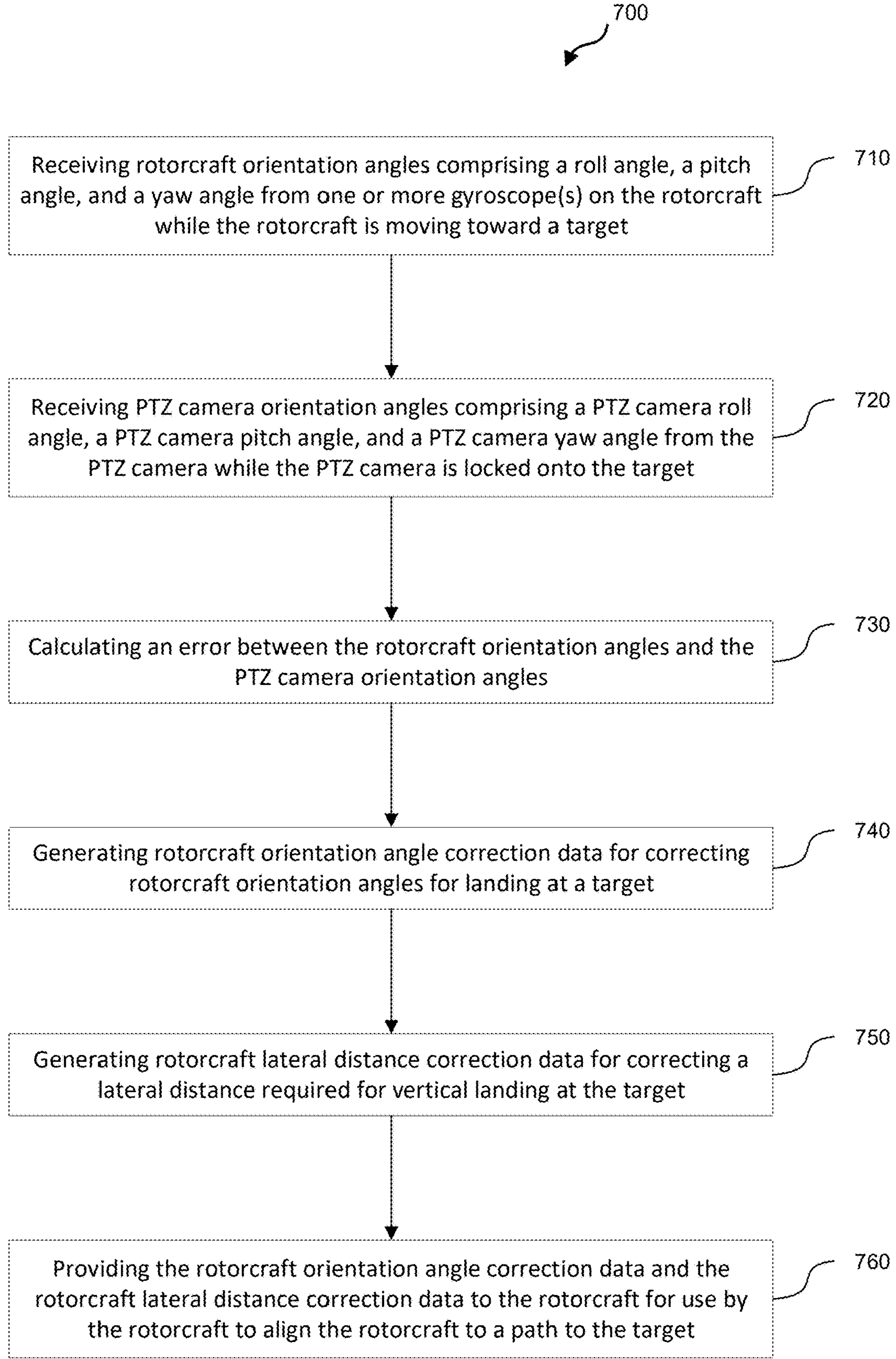
FIG. 7 is a flowchart of an example method for synchronizing a gyroscope on a rotorcraft to a gyroscope on a pan-tilt-zoom (PTZ) camera, in accordance with various embodiments.

FIG. 7 is a flowchart of an example method for synchronizing a gyroscope on a rotorcraft to a gyroscope on a pan-tilt-zoom (PTZ) camera. The process 700 is merely an example and is not intended to limit the present disclosure beyond what is explicitly recited in the claims. Additional steps may be provided before, during, and after process 700, and some of the steps described can be moved, replaced, or eliminated for additional embodiments of process 700.

At step 710, the example process 700 includes receiving rotorcraft orientation angles from the gyroscope on the rotorcraft. In various embodiments, the orientation angles comprise a roll angle ($\phi_r$), a pitch angle ($\theta_r$), and a yaw angle ($\psi_r$).

At step 720, the example process 700 includes receiving PTZ camera orientation angles from the gyroscope on the PTZ camera. In various embodiments, the orientation angles comprise a roll angle ($\phi_c$), a pitch angle ($\theta_c$), and a yaw angle ($\psi_c$).

At step 730, the example process 700 includes calculating error measurements between the rotorcraft orientation angles and the gyroscope orientation angles. In various embodiments, the error measurements comprise a roll angle error measurement ($\Delta\phi_c$), a pitch angle error measurement ($\Delta\theta_c$), and a yaw angle error measurement ($\Delta\psi_c$). In various embodiments, the roll angle error measurement ($\Delta\phi_c$) is equal to the PTZ camera roll angle ($\phi_c$) minus the rotorcraft gyroscope roll angle ($\phi_c$), i.e., $\Delta\phi_r=\phi_c-\phi_r$. In various embodiments, the pitch angle error measurement ($\Delta\theta_c$), is equal to rotorcraft gyroscope pitch angle ($\theta_r$) minus the PTZ camera pitch angle ($\theta_c$), i.e., $\Delta\theta_c=\theta_r-\theta_c$. In various embodiments, the yaw angle error measurement ($\Delta\psi_c$) is equal to the PTZ camera yaw angle ($\psi_c$) minus the rotorcraft gyroscope yaw angle ($\psi_r$), i.e., $\Delta\psi_c=\psi_c-\psi_r$. In various embodiments, the error measurements between the rotorcraft orientation angles and the gyroscope orientation angles are $(\Delta\phi_c, \Delta\theta_c, \Delta\psi_c)=(\phi_r-\phi_c, \theta_r-\theta_c, \psi_r-\psi_c)$.

At step 740, the example process 700 includes generating rotorcraft orientation angle correction data for correcting rotorcraft orientation angles for landing at a target. In various embodiments, generating rotorcraft orientation angle correction data for correcting rotorcraft orientation angles comprises generating rotorcraft orientation angle correction data using a feedback control algorithm based on the error between the rotorcraft orientation angles and the PTZ camera orientation angles. In some embodiments, the feedback control algorithm utilizes a PID feedback control algorithm to generate PTZ camera orientation angle adjustment data. In various embodiments, the feedback control algorithm uses a proportional controller. In some embodiments, the feedback control algorithm uses a proportional-integral-derivative controller (PID controller).

In various embodiments, a rotorcraft orientation angle correction is calculated based on a proportional gain times the orientation angle error i.e., $K_p(\Delta\phi_c, \Delta\theta_c, \Delta\psi_c)$, wherein $K_p$ is the proportional gain. In some embodiments, a rotorcraft orientation angle correction is calculated based on a proportional gain ($K_p$) times the error between the rotorcraft orientation angles and the PTZ camera orientation angles, a derivative gain ($K_d$) times a derivative of the error, and an integral gain ($K_i$) times an integral of the error. In various embodiments, the proportional gain $K_p$ includes a first proportional gain component $K_{p1}$, a second proportional gain $K_{p2}$, and a third proportional gain component $K_{p3}$.

In various embodiments, the rotorcraft orientation angle correction includes a roll angle correction ($\alpha\phi_r$), a pitch angle adjustment ($\alpha\theta_r$), and a yaw angle adjustment ($\alpha\psi_r$). In various embodiments, the roll angle adjustment ($\alpha\phi_r$) is calculated based on the first proportional gain component $K_{p1}$ times the roll angle error ($\phi_c-\phi_r$), e.g., $\alpha\phi_r=K_{p1}(\phi_c-\phi_r)$. In various embodiments, the pitch angle adjustment ($\alpha\theta_r$) is calculated based on the second proportional gain component $K_{p2}$ times the pitch angle error ($\theta_c-\theta_r$), e.g., $\alpha\theta_r=K_{p2}(\theta_c-\theta_r)$. In various embodiments, the yaw angle adjustment ($\alpha\psi_r$) is calculated based on the third proportional gain component $K_{p3}$ times the yaw angle error ($\psi_c-\psi_r$), e.g., $\alpha\psi_r=K_{p3}(\psi_c-\psi_r)$.

At step 750, the example process 700 includes generating rotorcraft lateral distance correction data ($\Delta x_r$, $\Delta y_r$, $\Delta z_r$) for correcting a lateral distance required for vertical landing at the target. In various embodiments, the rotorcraft lateral distance correction data ($\Delta x_r$, $\Delta y_r$, $\Delta z_r$) comprise an x-direction adjustment measurement ($\Delta x_r$), a y-direction adjustment measurement ($\Delta y_r$), and a z-direction adjustment measurement ($\Delta z_r$).

At step 760, the example process 700 includes providing the rotorcraft orientation angle correction data and/or the rotorcraft lateral distance correction data to the rotorcraft for use by the rotorcraft to align the rotorcraft to a path to the target.

Described herein are apparatus, systems, techniques, and articles for gyroscope synchronization. The apparatus, systems, techniques, and articles provided herein can provide enhanced stability. In various embodiments, gyroscope synchronization ensures stable video capture, even in dynamic environments with frequent movements.

The apparatus, systems, techniques, and articles provided herein can provide improved Precision. The apparatus, systems, techniques, and articles provided herein can enable precise tracking of individuals in distress, enhancing the effectiveness of rescue operations conducted by rotorcraft.

The apparatus, systems, techniques, and articles provided herein can provide enhanced safety. By maintaining a stable visual lock on individuals, the apparatus, systems, techniques, and articles provided herein can contribute to the safety and success of rescue missions, minimizing the risk of errors or accidents.

The apparatus, systems, techniques, and articles provided herein can provide adaptability. The gyroscope synchronized PTZ camera system can be easily integrated into existing rotorcraft rescue systems, offering a versatile solution for various operational scenarios.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A camera system on a rotorcraft, the camera system comprising:

a pan-tilt-zoom (PTZ) camera; and an electronics control unit configured to provide adjustment data to the PTZ camera for adjusting roll, pitch, and yaw orientation angles of the PTZ camera, the electronics control unit comprising a controller configured to:

receive rotorcraft orientation angles comprising a roll angle, a pitch angle, and a yaw angle from one or more gyroscope(s) on the rotorcraft;

receive PTZ camera orientation angles comprising a PTZ camera roll angle, a PTZ camera pitch angle, and a PTZ camera yaw angle from the PTZ camera;

calculate an error between the rotorcraft orientation angles and the PTZ camera orientation angles;

generate PTZ camera orientation angle adjustment data based on the error between the rotorcraft orientation angles and the PTZ camera orientation angles, wherein to generate PTZ camera orientation angle adjustment data the controller is configured to use a feedback control algorithm to generate PTZ camera orientation angle adjustment data based on the error between the rotorcraft orientation angles and the PTZ camera orientation angles; and provide the PTZ camera orientation angle adjustment data to the PTZ camera for use by the PTZ camera to adjust PTZ camera orientation angles;

wherein the PTZ camera is configured to adjust the PTZ camera orientation angles based on the PTZ camera orientation angle adjustment data.

2. The camera system of claim 1, wherein the error between the rotorcraft orientation angles and the PTZ camera orientation angles comprises a roll angle error measurement, a pitch angle error measurement, and a yaw angle error measurement.

3. The camera system of claim 2, wherein:

the roll angle error measurement is equal to rotorcraft gyroscope roll angle minus the PTZ camera roll angle;

the pitch angle error measurement is equal to rotorcraft gyroscope pitch angle minus the PTZ camera pitch angle; and the yaw angle error measurement is equal to rotorcraft gyroscope yaw angle minus the PTZ camera yaw angle.

4. The camera system of claim 1, wherein a PTZ camera orientation angle adjustment is equal to a proportional gain times the error between the rotorcraft orientation angles and the PTZ camera orientation angles.

5. The camera system of claim 1, wherein a PTZ camera orientation angle adjustment comprises a roll angle adjustment, a pitch angle adjustment, and a yaw angle adjustment.

6. The camera system of claim 5, wherein:

the roll angle adjustment is equal to a first proportional gain component $K_{p1}$ times a roll angle error measurement;

the pitch angle adjustment is equal to a second proportional gain component $K_{p2}$ times a pitch angle error measurement; and the yaw angle adjustment is equal to a third proportional gain component $K_{p3}$ times a yaw angle error measurement.

7. The camera system of claim 1, wherein the controller is further configured to:

receive a change in XYZ coordinate position of the rotorcraft;

calculate PTZ coordinate adjustment data for the PTZ camera based on the change in XYZ coordinate position of the rotorcraft; and provide the PTZ coordinate adjustment data to the PTZ camera;

wherein the PTZ camera is configured to adjust the PTZ camera orientation angles based on the PTZ coordinate adjustment data.

8. The camera system of claim 7, wherein the PTZ coordinate adjustment data comprises an x-direction adjustment measurement, a y-direction adjustment measurement, and a z-direction adjustment measurement.

9. The camera system of claim 8, wherein:

the x-direction adjustment measurement is equal to a change in rotorcraft x-direction position;

the y-direction adjustment measurement is equal to a change in rotorcraft y-direction position; and the z-direction adjustment measurement is equal to a change in rotorcraft z-direction position.

10. A computer-implemented method comprising:

receiving rotorcraft orientation angles comprising a roll angle, a pitch angle, and a yaw angle from one or more gyroscope(s) on a rotorcraft;

receiving PTZ camera orientation angles comprising a PTZ camera roll angle, a PTZ camera pitch angle, and a PTZ camera yaw angle from a PTZ camera on the rotorcraft;

calculating an error between the rotorcraft orientation angles and the PTZ camera orientation angles;

generating PTZ camera orientation angle adjustment data based on the error between the rotorcraft orientation angles and the PTZ camera orientation angles, wherein said generating the PTZ camera orientation angle adjustment data comprises generating the PTZ camera orientation angle adjustment data using a feedback control algorithm; and providing the PTZ camera orientation angle adjustment data to the PTZ camera for use by the PTZ camera to adjust PTZ camera orientation angles;

wherein the PTZ camera adjusts the PTZ camera orientation angles based on the PTZ camera orientation angle adjustment data.

11. The computer-implemented method of claim 10, wherein the error between the rotorcraft orientation angles and the PTZ camera orientation angles comprises a roll angle error measurement, a pitch angle error measurement, and a yaw angle error measurement.

12. The computer-implemented method of claim 11, wherein:

the roll angle error measurement is equal to rotorcraft gyroscope roll angle minus the PTZ camera roll angle;

the pitch angle error measurement is equal to rotorcraft gyroscope pitch angle minus the PTZ camera pitch angle; and the yaw angle error measurement is equal to rotorcraft gyroscope yaw angle minus the PTZ camera yaw angle.

13. The computer-implemented method of claim 10, wherein a PTZ camera orientation angle adjustment is equal to a proportional gain times the error between the rotorcraft orientation angles and the PTZ camera orientation angles.

14. The computer-implemented method of claim 10, wherein:

a PTZ camera orientation angle adjustment comprises a roll angle adjustment, a pitch angle adjustment, and a yaw angle adjustment;

the roll angle adjustment is equal to a first proportional gain component $K_{p1}$ times a roll angle error measurement;

the pitch angle adjustment is equal to a second proportional gain component $K_{p2}$ times a pitch angle error measurement; and the yaw angle adjustment is equal to a third proportional gain component $K_{p3}$ times a yaw angle error measurement.

15. The computer-implemented method of claim 10, further comprising:

receiving a change in XYZ coordinate position of the rotorcraft;

calculating PTZ coordinate adjustment data for the PTZ camera based on the change in XYZ coordinate position of the rotorcraft; and providing the PTZ coordinate adjustment data to the PTZ camera;

wherein the PTZ camera adjusts the PTZ camera orientation angles based on the PTZ coordinate adjustment data.

16. The computer-implemented method of claim 15, wherein the PTZ coordinate adjustment data comprises an x-direction adjustment measurement, a y-direction adjustment measurement, and a z-direction adjustment measurement.

17. The computer-implemented method of claim 16, wherein:

the x-direction adjustment measurement is equal to a change in rotorcraft x-direction position;

the y-direction adjustment measurement is equal to a change in rotorcraft y-direction position; and the z-direction adjustment measurement is equal to a change in rotorcraft z-direction position.

18. A camera system on a rotorcraft, the camera system comprising:

a pan-tilt-zoom (PTZ) camera; and an electronics control unit configured to provide adjustment data to the rotorcraft for aligning the rotorcraft to an intended path, the electronics control unit comprising a controller configured to:

receive rotorcraft orientation angles comprising a roll angle, a pitch angle, and a yaw angle from one or more gyroscope(s) on the rotorcraft while the rotorcraft is moving toward a target;

receive PTZ camera orientation angles comprising a PTZ camera roll angle, a PTZ camera pitch angle, and a PTZ camera yaw angle from the PTZ camera while the PTZ camera is locked onto the target;

calculate an error between the rotorcraft orientation angles and the PTZ camera orientation angles;

generate rotorcraft orientation angle correction data for correcting rotorcraft orientation angles for landing at a target;

generate rotorcraft lateral distance correction data for correcting a lateral distance required for vertical landing at the target; and provide the rotorcraft orientation angle correction data and the rotorcraft lateral distance correction data to the rotorcraft for use by the rotorcraft to align the rotorcraft to a path to the target.

19. The camera system of claim 18, wherein the error between the rotorcraft orientation angles and the PTZ camera orientation angles comprises a roll angle error measurement, a pitch angle error measurement, and a yaw angle error measurement.

20. The camera system of claim 18, wherein the controller is configured to:

generate the rotorcraft orientation angle correction data using a feedback control algorithm based on the error between the rotorcraft orientation angles and the PTZ camera orientation angles; and generate the rotorcraft lateral distance correction data using the feedback control algorithm based on the error between the rotorcraft orientation angles and the PTZ camera orientation angles.

* * * * *